June 23, 1953 — D. R. PEARL — 2,642,718
VARIABLE MINIMUM FLOW STOP
Filed June 20, 1951
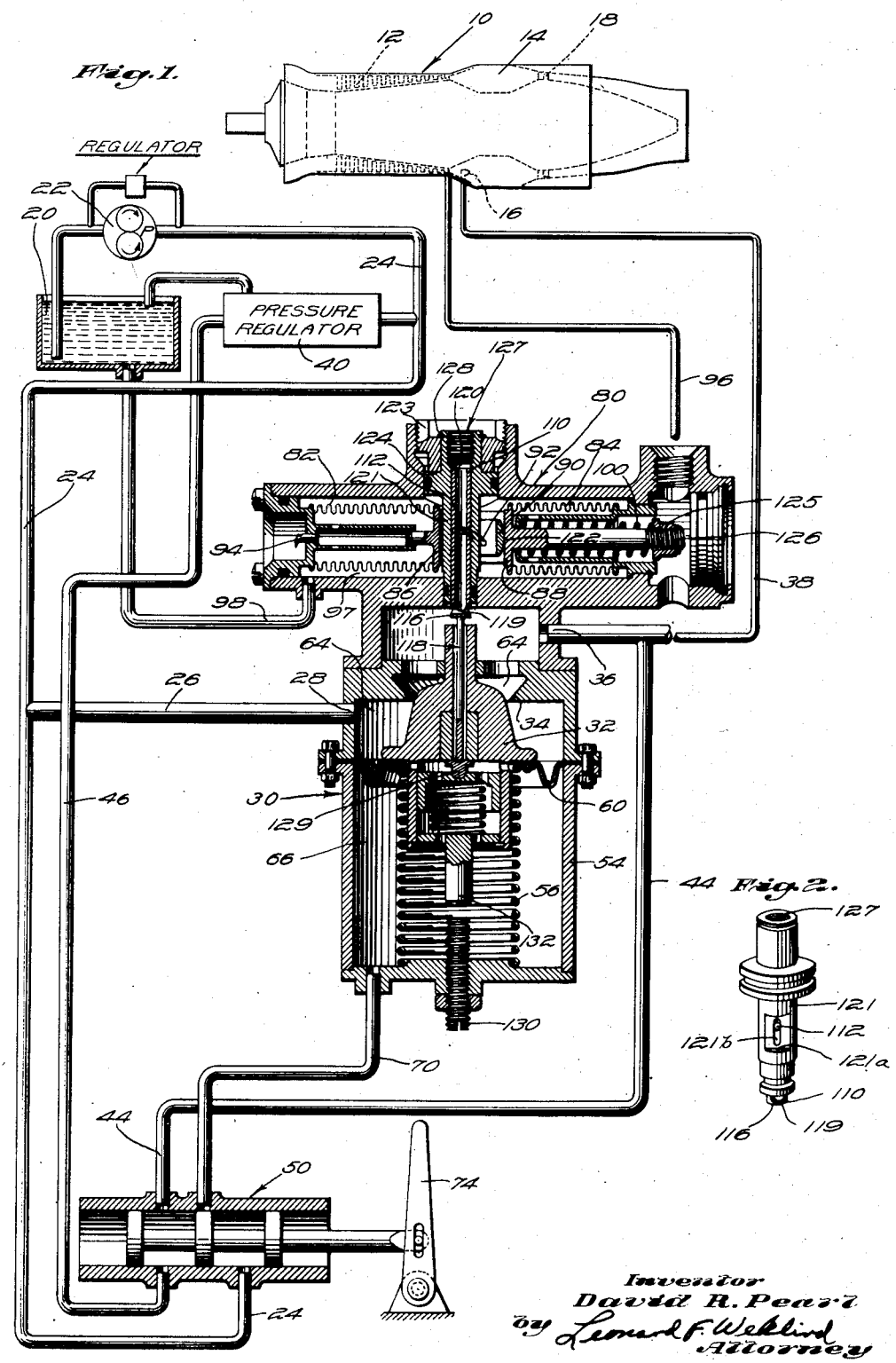
Inventor
David R. Pearl
by Leonard F. Weklind
Attorney Patented June 23, 1953

2,642,718

UNITED STATES PATENT OFFICE 2,642,718

VARIABLE MINIMUM FLOW STOP

David R. Pearl, West Hartford, Conn., assignor to United Aircraft Corporation, East Hartford, Conn., a corporation of Delaware Application June 20, 1951, Serial No. 232,569

14 Claims. (Cl. 60—39.28)

1

This invention relates to variable minimum flow mechanism for valves and more particularly to variable stops for throttle valves of gas turbine power plants.

In gas turbine power plant operation it has been determined that for any given value of gas turbine compressor outlet pressure a flame blowout may occur in the combustion chamber in the event that the fuel flow is suddenly reduced below that necessary to maintain the proper fuel-air ratio commensurate with the airflow through the engine. It is obvious, of course, that the minimum value of fuel flow necessary to maintain combustion will vary in accordance with changes in compressor outlet pressure.

Therefore, it is an object of this invention to provide a movable stop for limiting the closing movement of a throttle valve.

A still further object of this invention is to provide a movable stop of the type described which is automatically variable in accordance with a parameter of operation of the engine, as for example the compressor outlet pressure of a gas turbine power plant.

These and other objects of this invention will become readily apparent from the following detailed description of the drawing in which Fig. 1 is a partially schematic and partially cross-sectional illustration of the variable stop mechanism of this invention including its normal environment, and Fig. 2 is a detail showing of a sleeve.

Referring to Fig. 1, an axial flow gas turbine power plant is generally indicated at 10 and includes a compressor section 12, a combustion chamber 14 and a turbine 18. The fuel is directed to the nozzle 16 from a reservoir 20 by means of a pump 22 to the line 24 and then to line 26 and the inlet 28 of a throttle valve generally indicated at 30. The throttle valve 30 includes a movable valve element 32 which cooperates with the lip 34 to meter the fuel from the inlet 28 to the outlet 36. The outlet 36 leads to a line 38 which in turn communicates with the nozzle 16.

In order to accurately regulate the flow of fuel a predetermined pressure differential is maintained across the throttle valve 30, i. e., between the inlet 28 and the outlet 36. Thus, the pressure regulator 40 is operatively connected to the valve inlet line 24 while also being connected to the throttle valve outlet 36 by means of lines 44 and 46 which are interconnected through a control valve 50 to be described hereinafter.

The valve 30 includes a valve body 54 which surrounds the movable valve element 32 and contains a compression spring 56 which urges the valve element 32 toward a closed position. A diaphragm 60 is connected to the housing 34 and the valve element 32 thus forming upper chamber 64 and lower chamber 66 which are variable in volume in response to movements of the valve element 32 and the diaphragm 60, the diaphragm 60 being a movable wall of these chambers.

The inlet pressure in chamber 64 tends to move the valve toward an open position while the spring 56 tends to move it toward a closed position. It is then apparent that by admitting fuel under pressure into the chamber 66 or draining fluid from chamber 66 a servo control of the valve element 32 is effected. In order to obtain movement of the valve element 32 a valve 50 may be provided so as to connect the chamber 66 via line 70 to a high pressure source such as the throttle valve inlet pressure (line 24) or to a lower source of pressure, as for example the outlet pressure of the throttle valve via the line 44. The valve 50 may be controlled as shown by a control handle 74 or by any other means for automatic control of the valve.

The throttle valve mechanism described thus far is described in detail and claimed in copending patent application Serial No. 205,404, filed January 10, 1951, by Stanley G. Best and David R. Pearl.

As previously stated, it is desirable to provide a minimum flow stop for the throttle valve which stop can be varied in position in response to variations of compressor outlet pressure of the gas turbine power plant. To this end a variable minimum flow stop mechanism is provided as generally illustrated at 80. The variable stop mechanism 80 includes a bellows 82 and a bellows 84 acting in opposition to each other. Thus, the movable wall 86 of the bellows 82 and the movable wall 88 of the bellows 84 each bear against a cam element 90 which includes a cam slot 92. The bellows 82 is evacuated via the passage 94 which is subsequently sealed off. The interior of the bellows 84 on the other hand communicates with the compressor outlet by means of a line 96. The chamber 97, surrounding bellows 82 and 84 is vented to reservoir 20 via the line 98 to surround the bellows 82 and 84 with liquid for vibration damping and to limit the external pressure on both bellows. The compressor outlet pressure and a biasing spring 100 act to impart movement to the movable wall 88 of the bellows 84. A central movable sleeve 110 carries a pin 112 which engages the cam slot 92 so that the sleeve 110 will be moved axially in response to lateral movements of the cam element 90. The sleeve 110 includes an abutment 116 which engages with a stem 118 carried axially of the movable valve element 32 in order to limit a closing movement of the valve element 32. Thus, as the valve element 32 is moved upwardly toward a closed position, the stem 118 engages the abutment 116 to the extent that a valve 129 will be opened to permit communication between the chambers 64 and 66 of the throttle valve via a longitudinal slot in stem 118. This bleeds pressure between these two chambers so as to limit further movement of the movable element 32 of the throttle valve 30. A passage 119 through sleeve 110 connects chamber 64 to chamber 120 so as to balance pressures on both ends of sleeve 110 regardless of variations in outlet pressure in chamber 64. Chamber 120 is sealed by plug 127.

Sleeve 121 houses sleeve 110 and contains horizontal guide slots 121a (better seen in Fig. 2) which restrain cam element 90 from vertical motion. Sleeve 121 also has vertical slots 121b which engage pin 112 and restrain it from twisting in cam slots 92.

Both ends 122 of cam element 90 are crowned and are guided between the faces of end plates 86 and 88.

Sleeve 121 is constrained to travel vertically with nut 123 by shoulder 124 and retaining ring 128, so that adjustment of nut 123 varies the vertical position of cam element 90, thus varying the datum position of the cam 92 and providing an external adjustment for minimum flow through the orifice formed by 32 and 34.

Nut 125 is adjustable on screw 126 so that the force exerted by spring 100 may be varied to adjust the point at which compressor discharge pressure begins to vary the minimum flow stop.

An adjustable stop 130 may be provided in the lower portion of the throttle valve casing 54 so as to engage the stem 132 depending from the valve element 32 to provide a maximum flow opening for the throttle valve.

It is obvious that as a result of this invention an automatically variable minimum flow stop has been provided for accurately, yet simply, controlling the minimum flow opening for a throttle valve of a gas turbine power plant.

Although only one embodiment of this invention has been illustrated and described herein, it will be apparent that various changes and modifications will be made without departing from the scope of this novel concept.

What it is desired to obtain by Letters Patent is:

1. In a gas turbine engine having a compressor and a combustion section, a throttle valve for regulating fuel flow to said combustion chamber including a movable member, means for moving said movable member, a stop for limiting the movement of said member in one direction, and means for adjusting said stop comprising pressure responsive mechanism and a conduit connecting said mechanism with said compressor.

2. In a gas turbine engine having a compressor and a combustion section, a throttle valve for regulating fuel flow to said combustion chamber including a movable member, means for moving said movable member, a stop for limiting the movement of said member in one direction, means for adjusting said stop comprising a cam member movable in response to variations of the outlet pressure of said compressor and engaging said stop, and a conduit connecting said last mentioned means with said compressor.

3. In a variable stop mechanism for a flow regulating valve, said valve having a movable valve member, means for limiting the movement of said member in one direction comprising a stop engageable with said member, a plurality of pressure sources, and means for adjusting said stop including mechanism operatively connected to said sources and responsive to the pressures therein.

4. In a variable stop mechanism for a flow regulating valve, said valve having a movable valve member, means for limiting the movement of said member in one direction comprising a stop engageable with said member, and means for adjusting said stop comprising an evacuated bellows urging said stop in one direction and a second bellows urging said stop in another direction, and a spring urging said stop in said other direction.

5. In a gas turbine power plant having a combustion chamber, a source of fuel under pressure, a throttle valve for regulating the flow of fuel to said combustion chamber including a movable valve element for varying said flow, a stop for limiting the closing movement of said valve and engaged by said element, servo means including an element movable in response to a parameter of engine operation, and means operatively connecting said stop and servo means for varying the position of said stop.

6. In a gas turbine power plant having a compressor and a combustion section, a source of fuel under pressure, a valve having an intake side receiving fuel from said source and a discharge side communicating with said combustion section, regulator means for maintaining the pressure on each side of said valve at a predetermined differential, means for varying the flow of fuel from one side of said valve to the other comprising a movable valve element, a variable volume chamber having a movable wall operatively connected to said valve element, a valve member cooperating with said element forming a variable opening, a spring urging said element in one direction, means for applying the pressures on each side of said valve to one of the sides of said movable wall respectively, means for metering fuel to and from one side of said movable wall to position said valve element, a stop for limiting the movement of said valve element in one direction, means for automatically adjusting the position of said stop comprising a servo unit operatively connected to said stop, and means for controlling said servo comprising mechanism responsive to compressor outlet pressure and having operative connections to said servo.

7. In a gas turbine according to claim 6 wherein said servo unit comprises opposing bellows with one of said bellows having its interior exposed to compressor outlet pressure.

8. In a gas turbine according to claim 7 wherein the other of said bellows is evacuated.

9. In a gas turbine according to claim 8 wherein said bellows are operatively connected to a cam for moving the latter, and said stop includes an element engaging said cam.

10. In a gas turbine according to claim 9 wherein said movable valve element includes a hollow bore and a valve, said valve being opened upon engagement of said valve element with said stop to provide communication between the two sides of said movable wall.

11. In a gas turbine according to claim 9 wherein a biasing spring aids one of said bellows for moving said cam, and means for adjusting the pressure exerted by said spring.

12. In a gas turbine according to claim 11 wherein means are provided for initially adjusting the relationship between said stop element and cam including a member movable along the axis of said movable valve element.

13. In a fuel control for a gas turbine power plant, the power plant comprising a compressor, a combustion chamber and a turbine for driving the compressor, means for supplying fuel to said combustion chamber including a throttle valve, means for maintaining a predetermined relationship between the inlet and outlet pressures of said throttle valve, means for moving said throttle valve in fuel increasing and decreasing directions including a fluid servo mechanism, said servo mechanism comprising a pilot valve for selectively utilizing said inlet and outlet pressure for moving said throttle valve and including operative connections to said throttle valve, means for limiting the minimum opening of said throttle valve, and means for varying said limiting means in response to variations in compressor outlet pressure and atmospheric pressure.

14. In a variable stop mechanism for a flow regulating valve, said valve having a movable valve member, means for limiting the movement of said member in one direction comprising a stop engageable with said member, at least one source of fluid under pressure, means for adjusting said stop, and mechanism operatively connecting said adjusting means and said source for controlling said adjusting means.

DAVID R. PEARL.

References Cited in the file of this patent

UNITED STATES PATENTS

| Number | Name | Date |
|---|---|---|
| 2,570,591 | Price | Oct. 9, 1951 |
| 2,593,536 | Chamberlin | Apr. 22, 1952 |